United States Patent [19]

Hasuo et al.

[11] Patent Number: 4,921,109

[45] Date of Patent: May 1, 1990

[54] CARD SORTING METHOD AND APPARATUS

[75] Inventors: Shigetsuyo Hasuo; Shigeru Kanazawa; Teruo Kenmochi; Takamitsu Kadokura, all of Tokyo, Japan

[73] Assignee: Shibuya Computer Service Kabushiki Kaisha, Tokyo, Japan

[21] Appl. No.: 158,116

[22] Filed: Feb. 16, 1988

[30] Foreign Application Priority Data

May 7, 1985 [JP] Japan .................................. 60-95365
Sep. 27, 1985 [JP] Japan ................................ 60-212586

[51] Int. Cl.$^5$ .............................................. B07C 3/10
[52] U.S. Cl. .................................. 209/552; 209/583; 209/900
[58] Field of Search ............... 209/547, 552, 559, 564, 209/565, 583, 584, 900

[56] References Cited

U.S. PATENT DOCUMENTS

| | | | |
|---|---|---|---|
| 3,452,509 | 7/1969 | Hauer | 209/900 |
| 3,573,748 | 4/1971 | Holme | 209/900 |
| 4,247,008 | 1/1981 | Dobbs | 209/900 |
| 4,388,994 | 6/1983 | Suda et al. | 209/900 |
| 4,566,595 | 1/1986 | Fustier | 209/900 |
| 4,601,396 | 7/1986 | Pavie | 209/584 |

FOREIGN PATENT DOCUMENTS

| | | | |
|---|---|---|---|
| 2552686 | 4/1985 | France | 209/583 |
| 56-42010 | 10/1981 | Japan . | |
| 58-33573 | 7/1983 | Japan . | |
| 60-15966 | 4/1985 | Japan . | |

Primary Examiner—Donald T. Hajec
Attorney, Agent, or Firm—Lynn L. Augspurger

[57] ABSTRACT

A card sorting apparatus includes at least two card stackers, a sensor for reading characters, symbols and the like attached to the cards, a card rack for holding a plurality of cards, and a memory for storing information indicative of the cards held by the card rack. The card rack is connected to at least one of the card stackers accommodating cards. A predetermined number of cards are first transferred to the card rack and a comparison is performed between a group of cards in the card rack and cards transferred to the card rack next. Cards satisfying comparison conditions are fed into either of the card stackers and cards are sorted in advance between the card rack and card stacker. Also provided is a card sorting rack for the sorting apparatus, the rack having a plurality of card supporting members for supporting cards, and a moving member for selectively moving at least one of the card supporting members to extract the corresponding card.

2 Claims, 10 Drawing Sheets

F I G. 5 (A)
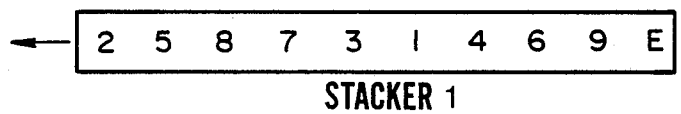
F I G. 5 (B)
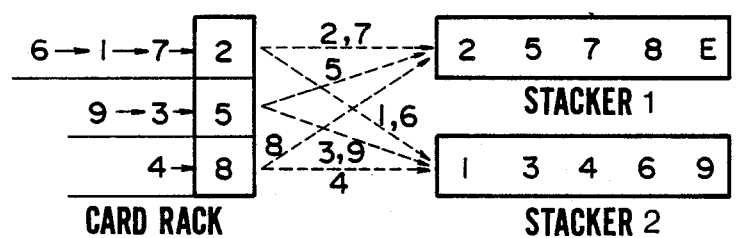
F I G. 5 (C)
F I G. 5 (D)

CARD SORTING METHOD AND APPARATUS

This is a continuation of co-pending application Ser. No. 857,231, filed on Apr. 29, 1986, now abandoned.

BACKGROUND OF THE INVENTION

1. Field of the Invention:

This invention relates to a method and apparatus for sorting cards in a predetermined order in a highly effective manner while boxes accommodating the cards are reduced in number. The invention also concerns a rack for sorting the cards.

2. Description of the Prior Art:

In the conventional apparatus of the above-described type, cards are delivered one at a time from a single hopper holding a plurality of the cards, sorting codes attached to the cards are read, and a card having the read code is accommodated in any one of a plurality of stackers in accordance with a predetermined sorting method. With an apparatus of this type, however, the number of stackers provided must conform to the number of cards to be sorted. In consequence, the apparatus itself is large in size and high in cost. Moreover, since it is impossible to increase the number of stackers without limit, it becomes necessary to change the sorting method and resort the cards a number of times when the number of classes for sorting is greater than the number of stackers. When performing the resorting operation, the cards that have already been placed in the stackers must be returned to the hopper, followed by changing the resorting method. This is a troublesome operation which lengthens processing time and increases the number of times the cards are introduced and extracted. As a result, the cards are damaged in a short period of time.

SUMMARY OF THE INVENTION

Accordingly, an object of the present invention is to provide a card sorting apparatus which is small in size and low in cost, and which enables cards to be sorted very effectively through a small number of card movements irrespective of whether the number of sorting types is large or small.

Another object of the present invention is to provide a card sorting method and apparatus which enables cards to be sorted without complicating the task of the operator.

Still another object of the present invention is to provide a card sorting method and apparatus which reduces card damage by reducing the number of times cards are moved.

A further object of the present invention is to provide a slender, structurally simple and inexpensive card sorting rack.

Yet another object of the present invention is to provide a card sorting rack which is not readily affected by the thickness and material of the cards and which develops but little static electricity.

Other features and advantages of the present invention will be apparent from the following description taken in conjunction with the accompanying drawings, in which like reference characters designate the same or similar parts throughout the figures thereof.

BRIEF DESCRIPTION OF THE DRAWING

FIGS. 5(A) through (D) are views illustrating an example of a sorting operation performed by the card sorting apparatus of the present invention;

DESCRIPTION OF THE PREFERRED EMBODIMENT

Figure 1:
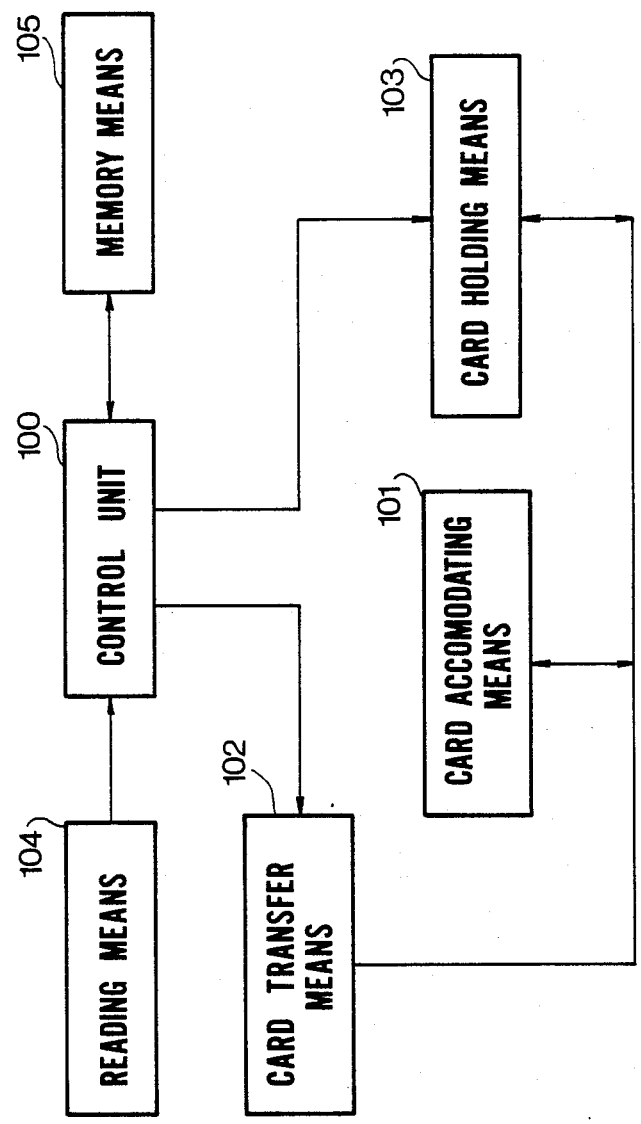
FIG. 1 is an overall block diagram illustrating an embodiment of a card sorting apparatus according to the present invention.

As shown in FIG. 1, an embodiment of a card sorting apparatus according to the present invention includes a control unit 100, at least two card accommodating means 101, card transfer means 102 for feeding cards, card holding means 103 for holding a plurality of cards, reading means 104 for reading characters, symbols and the like attached to the cards, and memory means for storing card information relating to the cards held by the card holding means 103. The apparatus, which is under the control of the control unit 100, is adapted to transfer a predetermined number of cards from at least one of the card accommodating means 101 to the card holding means 103, introduce a card satisfying certain comparison conditions into a receiving section of any one of the card accommodating means, compare all of the cards and then sort these cards using each of the card accommodating means.

In the arrangement of FIG. 1, the cards contained in the card accommodating means 101 are successively stored in the card holding means 103 while the characters and symbols on the cards are read by the reading means 104. The control unit 100 performs a predetermined calculation with respect to a plurality of the cards held by the card holding means 103 and, on the basis of the results of these combinations, sorts the cards in the card accommodating means 101. When this operation has been performed for all of the cards to distribute the cards among the plural card accommodating means 101, the control unit 100 performs a card comparison among the card accommodating means and feeds cards into any of these card accommodating means.

Thus, as may be understood from this description and drawings, the one card in the card holding means rack portion 5 which meets the selecting condition on the basis of the comparison is delivered to a receiving section 28, 29 of any of the card accommodating means 101 1, 2, to empty the rack portion where the one card had been held.

A preferred embodiment of the present invention will now be described with reference to FIGS. 2 through 5.

Figure 2:
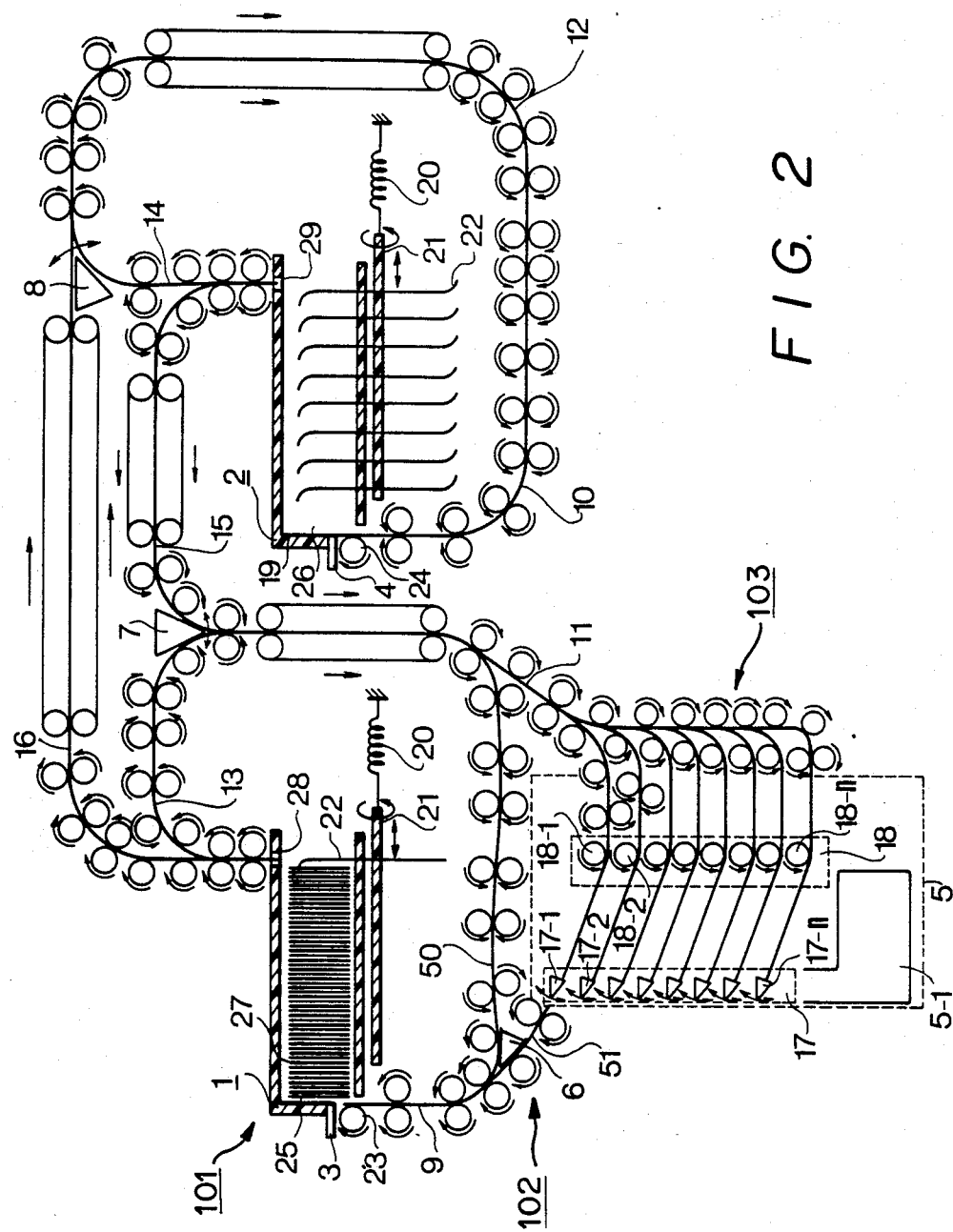
FIG. 2 is a mechanical block diagram illustrating the embodiment of the card sorting apparatus.
Figure 3:
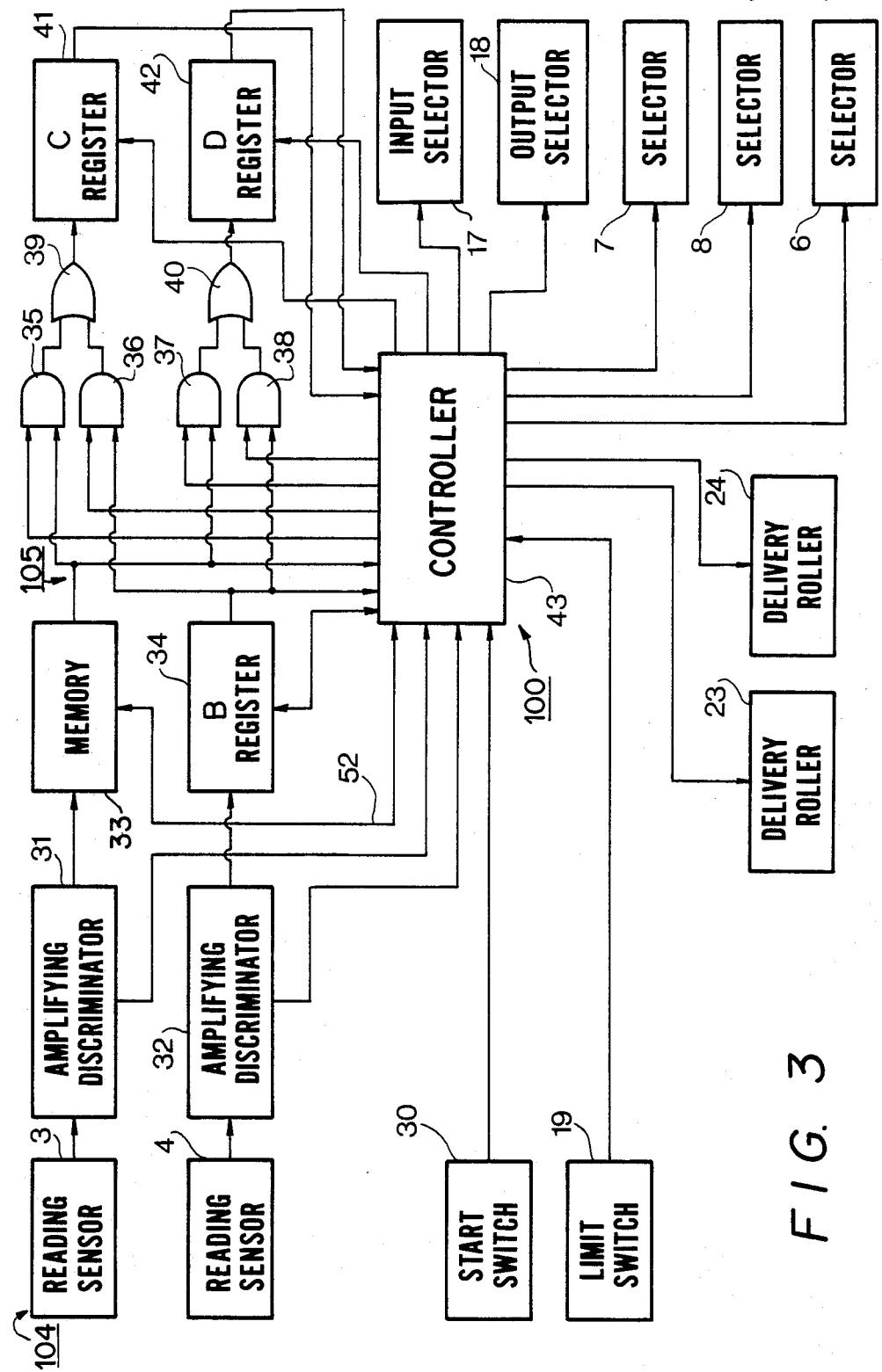
FIG. 3 is a more detailed electrical block diagram illustrating the embodiment of the card sorting apparatus.
Figure 4:
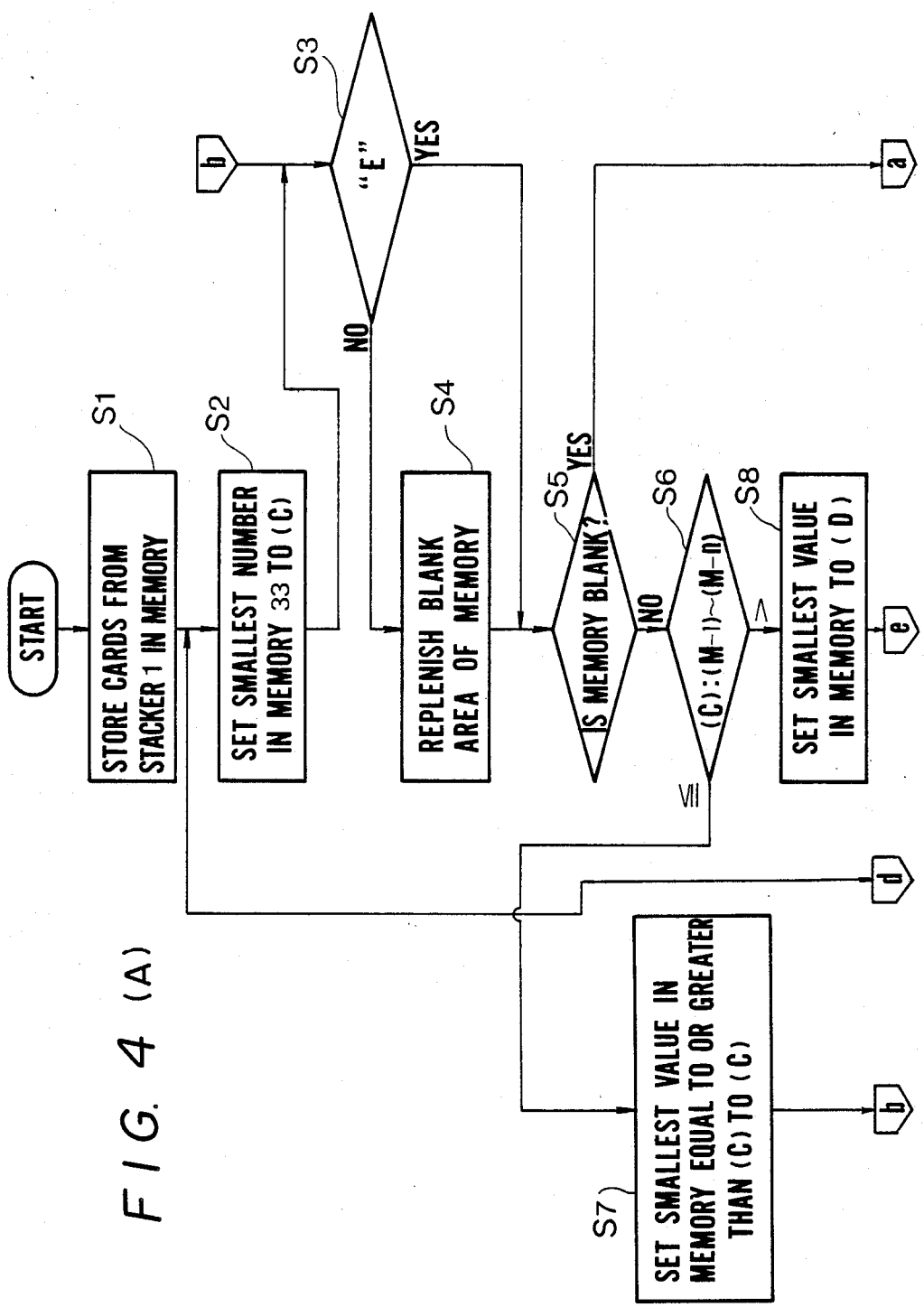
FIGS. 4(A) through 4(C) are flowcharts showing the operation of a control unit included in the card sorting apparatus of the present invention.
Figure 4:
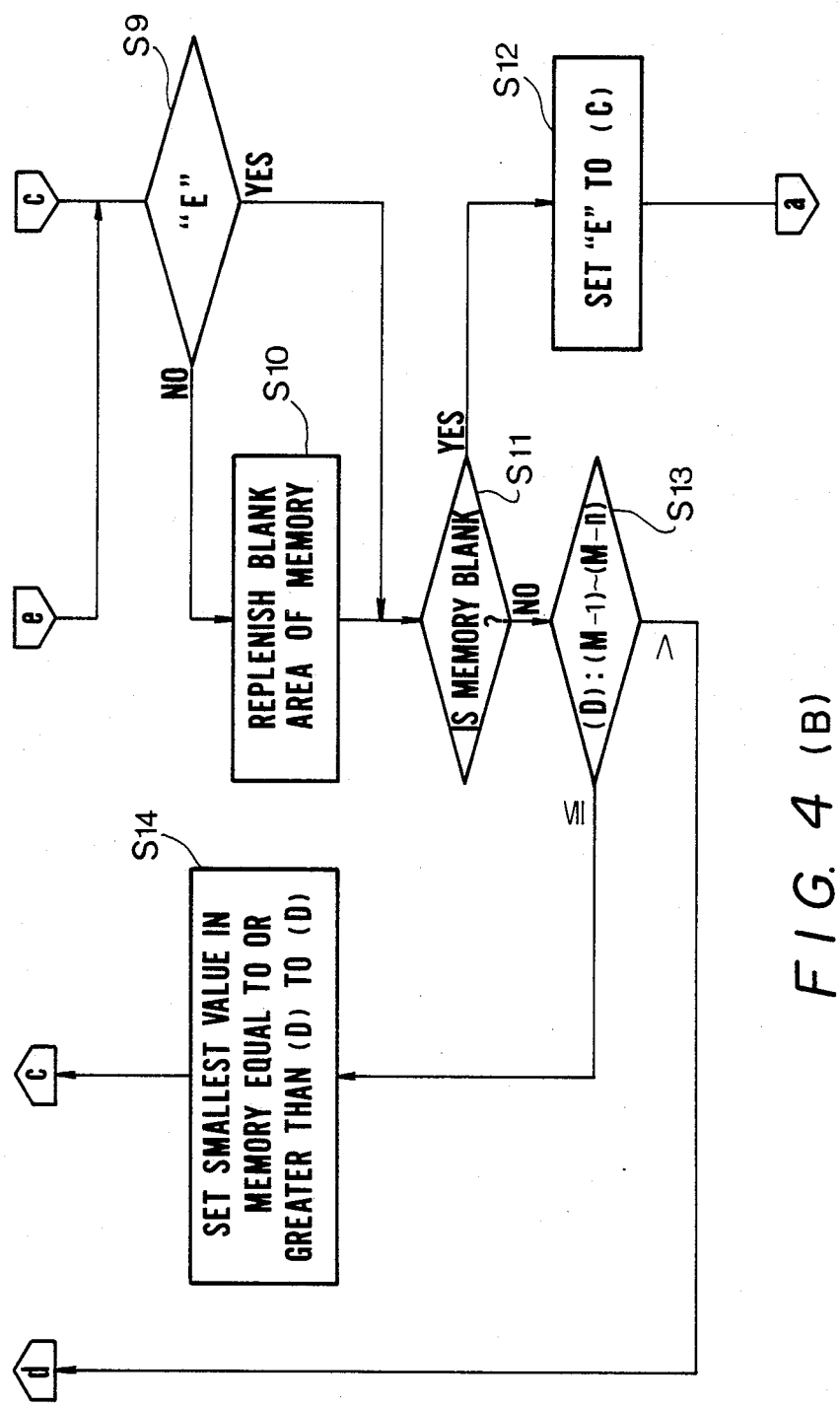
Figure 4:
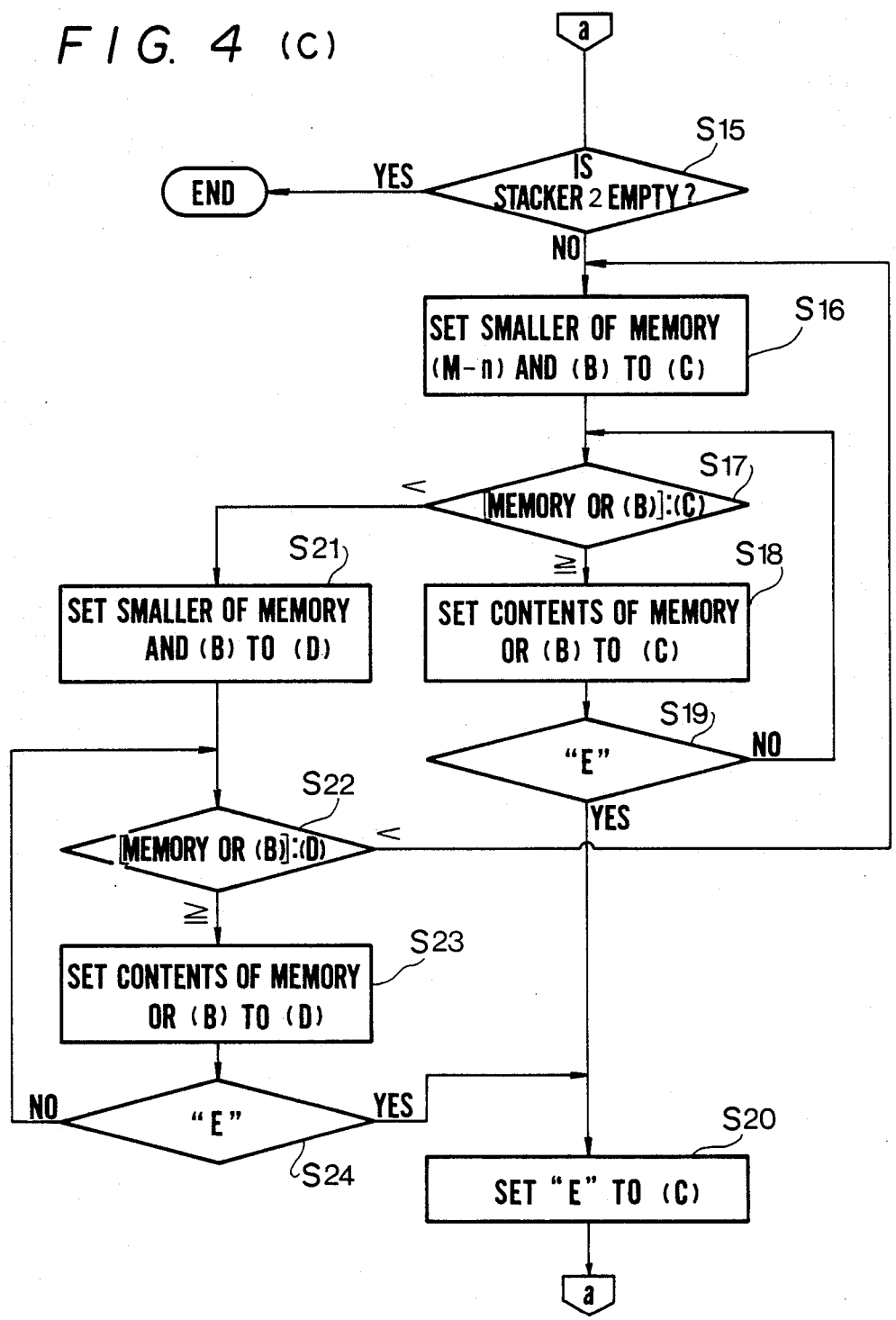

FIGS. 2 and 3 are mechanical and electrical block diagrams, respectively, illustrating a preferred embodiment of the card sorting apparatus. With reference first to the mechanical block diagram of FIG. 2, there are shown card accommodation means 101 implemented by a main card accommodating means having the form of stacker 1 having its receiving section 28 and by another card accommodating means with another stacker 2 having its own receiving section 29 of identical construction. Provided inside each of the stackers of the card accommodating means has its own stacking means provided in the form of a rotary shaft 21 having spirally shaped folds 22 attached integrally thereto. The right end of the rotary shaft 21 is rotatably connected to one end of a spring 20 whose other end is fixed against movement. The rotary shaft thus is capable of rotating and of moving axially both leftward and rightward. The folds 22 and rotary shaft 21 constitute a card transfer mechanism. Located above and to the right of the stackers 1, 2 are card receiving sections 28, 29 from which cards are fed into the respective stackers 1, 2. The cards are then moved leftward with the rotation of the rotary shafts 21 so as to be collected in card delivery sections 25, 26 as an input queue or input stack of cards. The arrangement is such that a suitable pressing force derived from the action of the springs 20 acts upon cards 27, which have collected in the card delivery sections 25, 26, via the rotary shafts 21. Thus, the leftmost of the cards 27 in the card delivery sections 25, 26 are pressed against the inner side walls of the delivery sections 25, 26 and respective delivery rollers 23, 24 at all times. Accordingly, whenever the delivery rollers 23, 24 are rotated intermittently, cards are delivered from the delivery sections 25, 26 toward respective travel paths 9, 10 one at a time. Provided on the inner wall of the delivery section 26 of stacker 2 is a limit switch 19 for sensing that the card delivery section 26 has been completely filled with the cards 27. This will be described later with reference to FIG. 3. Though the construction of the stackers 1, 2 obviously is not limited to that described above, each stacker must possess at least a first-in first-out function.

The delivery sections of the stackers 1, 2 are provided with reading sensors 3, 4, respectively, for reading characters and symbols on the cards fed next by the rotation of the delivery rollers 23, 24 of the card transfer means 102 which includes the transport paths 9, 10, 11, 50 etc. for feeding and transferring cards between the plurality of card accommodating means (101) stackers 1, 2. A card delivered to the travel path 9 by the delivery roller 23 of stacker 1 is fed by a selector portion 6 to a card rack 5 serving as card holding means for holding a plurality of cards. The cards are distributed to the card holding rack 5 by an input selector portion 17. When cards have been distributed to the entirety of the rack 5, the characters and symbols on all cards in the rack 5 are compared with one another in terms of magnitude. For example, when a card having a minimum value is sent out of the rack 5 by an output selector portion 18, the stacker 1 again delivers a card to the thus emptied section of the rack 5. The card extracted from the rack 5 is fed out to a travel path 11 and is then selectively delivered to a travel path 13 or 15 by a selector section 7. Thus, a card from the card rack 5 is either reintroduced as the input queue to the stacker 1 or introduced to the other stacker 2. The travel path changeover performed by the selector section 7 is based upon the results of the comparison mentioned above. Cards are thus arranged in the stacker 1 or stacker 2 in, e.g. ascending or decending order. By passing all of the cards initially set in the stacker 1 through the rack 5, the stackers 1 and 2 will each come to possess a group of several cards sorted in ascending or decending order.

The cards in the input queues of the card accommodating means 1, 2 are then resorted and arranged in the predetermined order in the main card accommodating means 1 to complete the sorting.

So-caller "error cards" not read by the reading sensor 3 are collected in a lowermost stacker stage 5-1 of the card stacker 5 by pointing the input collector section 17 upward to place it in the off state.

The overall operation of the apparatus will now be described in conjunction with the electrical arrangement by referring to FIG. 3.

At the start of the sorting operation, a plurality of cards to be sorted are suitably disposed in the card delivery section 25 of the stacker 1 beforehand to arrive at the condition shown in FIG. 2. In this case, the card at the end of those in the delivery section, namely the card at a position closest to the card receiving section 28, is an end card bearing the character "E" serving as end data. This "E" end card is used for sorting control purposes as described herein as end data. Sorting can continue without end data being read as described herein.

When a start switch 30 is pressed under the conditions shown in FIG. 2, a controller 43 causes cards to be delivered one at a time from the stacker 1 to the travel path 9. This is achieved by providing the delivery roller 23, which is attached to the rotary shaft of a motor, with a motor drive signal from the controller 43 in such a manner that the roller 23 will rotate for a certain period of time. Cards delivered in this manner are caused to travel toward the card rack 5 by the selector section 6 on the travel path 9. The characters, symbols and the like attached to the cards beforehand are read by the reading sensor 3 at the card delivery section 25 of stacker 1. The reading sensor 3 produces a read signal indicative of the data read. The signal is amplified by an amplifying discriminator 31 before being set in a memory 33.

While cards corresponding to the number of racks in the card rack 5 are being read by the reading sensor 3, the controller 43 cause these cards to be sent to the travel path 51 by the selector section 6 so that the cards are selected in order starting from 17-1 of the input selector section 17 of card rack 5, whereby the cards on the travel path 51 are successively stored one at a time in the card rack 5 starting from the upper portion thereof. In parallel with this operation, the values of characters and symbols read by the reading sensor 3 are successively stored in the memory 33 via the amplifying discriminator 31.

When cards have been set in all racks of the card rack 5, all of the cards are compared with one another in terms of magnitude and, on the basis of the comparison, one card in the rack 5 is selected and delivered to the travel path 11 by rotating one of the delivery rollers 18-1 through 18-n of the output selector section 18. The card is then delivered to the travel path 13 or 15 by the selector section 7 to be stored in the stacker 1 or 2.

In FIG. 3, this is performed by reading the contents of the memory 33 using an address signal 52 corresponding to the order of cards in the rack. In a case where it is necessary to feed a card from the card rack 5 into the stacker 1, an AND gate 35 is selected so that one output of the memory 33 is set in a C-REG 41 via an OR gate 39. When it is necessary to feed a card into the stacker 2, an AND gate 37 is selected so that the output of the memory 33 is set in a D-REG 42. Note that when a card is extracted from the card rack 5, a portion of the rack is supplemented with a card from the stacker 1.

The above comparison control operation performed by the card rack 5 is carried out until the reading sensor 3 senses an "E" card. At this time, all of the cards in the card rack 5 will have been sent to the stacker 1 or 2 through an operation similar to the comparison control operation performed so far. Thereafter, the "E" card is delivered to the travel path 9 and thence to travel path 50 by the selector section 6. The card is then delivered to the travel path 13 by the selector section 7 to be set in the receiving section 28 of the stacker 1. This is followed by performing comparison control based on the reading sensors 3, 4 of the respective stackers 1, 2 without using the card stacker 5. When it becomes clear from an output produced by the limit switch 19 that there are absolutely no cards in the stacker 2 when the reading sensor 3 is reading the "E" card, the controller 4 causes the "E" card to be sent to the receiving section 28 of the stacker to complete the sorting operation.

An example of the foregoing card sorting method is readily achieved in the following manner. The sorting method, described for a case where the contents of memory 33, B-REG 34, C-REG 41 and D-REG 42 are (M-1)-(M-n), (B), (C) and (D), respectively, is illustrated by the flowchart shown in FIG. 4(A)-4(C).

First, at a step S1 of the flowchart, the cards in the stacker 1 are stored in the card rack 5 and, at the same time, character and symbol information read by the reading sensor 3 is stored in the memory 33. Step S2 calls for discriminating the card in the card rack 5 having the smallest number, namely the smallest number in the memory 33, and for setting this number to C. It is determined at a step S3 whether the reading sensor 3 has discriminated the "E" card. If it has not, the program proceeds to a step S4, where card information from the stacker 1 is set anew in the area of memory 33 read at the step S2. It is determined at a step S5 whether the memory 33 is blank. If the memory is blank, the program proceeds to a step S15; if not, the program proceeds to a step S6, where the value of (C) is compared with the values of (M-l)-(M-n) from memory 33. If the number is equal to or greater than (C), the program proceeds to a step S7, where the minimum value in memory 33 satisfying the condition of step S6 is set to (C). The program then returns to the step S3.

When it is found at the step S6 that a value equal to or greater than (C) no longer exists in the memory 33, the program proceeds to a step S8, where the minimum value in memory 33 is set to (D). This means that a card is set in the stacker 2. Next, at a step S9, it is determined whether the reading sensor has read an "E" card. If it has not, a step S10 calls for information from the stacker 1 to be set in a blank portion of the memory 33. If an "E" card is discriminated at the step S9, the memory 33 is not replenished with information and the foregoing operation is repeated until the memory 33 is emptied. This is similar to the case described above with respect to step S3. A step S11 calls for a determination at to whether memory 33 is blank; if it is, "E" is set to (C) at a step S12 to bring the "E" card to the very end of stacker 1. If the memory 33 is found not to be vacant at the step S11, then the program proceeds to a step S13, where it is determined whether the memory 33 contains a value equal to or greater than (D). If it does, then the program proceeds to a step S14, where the smallest value in memory 33 satisfying the condition of the step S13 is set to (D), after which the program returns to the step S9. If a value satisfying the condition of step S13 is not contained in the memory 33, the program returns to the step S2 and the above-described operation is performed again.

Processing ends when an output from the limit switch 19 shows that there are no cards in the stacker 2. If the stacker 2 is not empty, the program proceeds to a step S16, at which the values read by the reading sensors 3 and 4, e.g. the value of (M-n) in memory 33 and B, are compared, where the value sensed by the reading sensor 3 is assumed to be stored at the last address (M-n) of memory 33 (at this time the address signal 52 is fixed at n). The smaller value is set to (C), i.e., in stacker 1. A step S17 calls for a determination as to whether memory (M-n) or (B) is equal to or greater than (C). If this condition is satisfied, the smaller value of memory (M-n) or (B) is set to (C) at a step S18. A step S19 calls for a determination as to whether "E" has been sensed by the reading sensor 3. If "E" has not been sensed, the program proceeds to a step S17; if it has, the program proceeds to a step S20, where "E" is set to (C) and the program returns to the step S15.

If there is no number that satisfies the condition of step S17, the program proceeds to a step S21, at which the smaller of (M-n) or (B) is set to (D). In other words, the card having this value is set in the receiving section 29 of the stacker 2. If is found at a step S22 that the value of memory (M-n) or of (B) is equal to or greater than (D), then the program proceeds to a step S23, where the smaller value of memory 33 or (B) is set to (D). If the condition of step S22 is not satisfied, on the other hand, the above-operation is performed again. It is determined at a step S24 whether "E" has been sensed by the reading sensor 3. The program returns to the step S22 if "E" has not been read, and proceeds to a step S20 if it has.

In order that cards may be exchanged between the stackers 1 and 2 from step S16 onward, the selector section 6 is controlled in such a manner that cards on travel path 9 traverse the travel path 50. The selector section 7 is controlled in a similar manner depending upon whether the setting is made to (C) or (D).

FIGS. 5(A)-(D) illustrate how the order of the cards in stacker 1 is changed through the intermediary of the card rack 5 and stacker 2.

FIG. 5(A) shows an example of cards initially introduced to the stacker 1, and FIG. 5(B) illustrates a case where the card rack 5 has three racks, in which cards 2, 5, 8 are initially set (step 1). Next, the values of the cards in the card rack 5 are compared (step 2). Among the cards in the card rack 5, the card having the minimum value of 2 is delivered to the receiving section 28 of the stacker 1 (step 3). The next card, the value of which is 7, is then taken from the stacker 1 and set in the card rack 5 at the location previously occupied by the 2 card (step 4). Thus, cards having numerical values 7, 5, 8 are held by the card stacker 5. Among the cards now in the rack 5, the card having the minimum value 5, which is larger than 2, is delivered to the stacker 1 (step 6). Next, a card having the numerical value 3 is delivered from the stacker 1 to the location of the card rack 5 previously occupied by the 5 card (step 7). The cards in the rack 5 now have numerical values 7, 3, 8. Next, among the cards in the rack, the card having the minimum value 7, which is greater than 5, is sent to the stacker 1. The card having the value 8 is now sent from the rack 5 to the stacker 1, so that the cards in the rack 5 now have values of 1, 3, 4. When this occurs, stacker 2 is selected and is successively supplied with the cards having the smallest numerical values in the card rack 5. FIG. 5(B) shows the results of sorting cards in the stackers 1 and 2 in the above manner. Thereafter, cards are selectively arranged in the stackers 1 and 2 as described in flowchart (FIG. 4) step S16 through step S19 and the cards are then stacked in the stacker 1 in numerical order starting from the lower numerical values, as shown in FIG. 5(C). The stacker 2 is emptied, as shown in FIG. 5(D).

According to the present invention, a magnetic ink character reader or an optical character reader can be used as the reading sensors, and sensors capable of reading codes can also be used. Further, though the invention has been described for a case where codes are arranged in simple numerical order, the apparatus of the invention can be used to rearrange codes and numerals in a predetermined order.

In the above description, two stackers and a card rack having three racks are used. However, it will readily occur to those skilled in the art that the invention is not limited to such an arrangement. Further, the card transfer sections, card rack input selector and card rack output selector are not limited to the constructions of the abovedescribed embodiment. For example, cards can be blown in and out by means of air. In addition, there is no particular restriction upon the physical size of the cards. The cards need not be of the same size so long as the characters attached to the cards can be read by the reading sensors.

Let us now describe the card rack 5 for the card sorting apparatus of the present invention.

Figure 6:
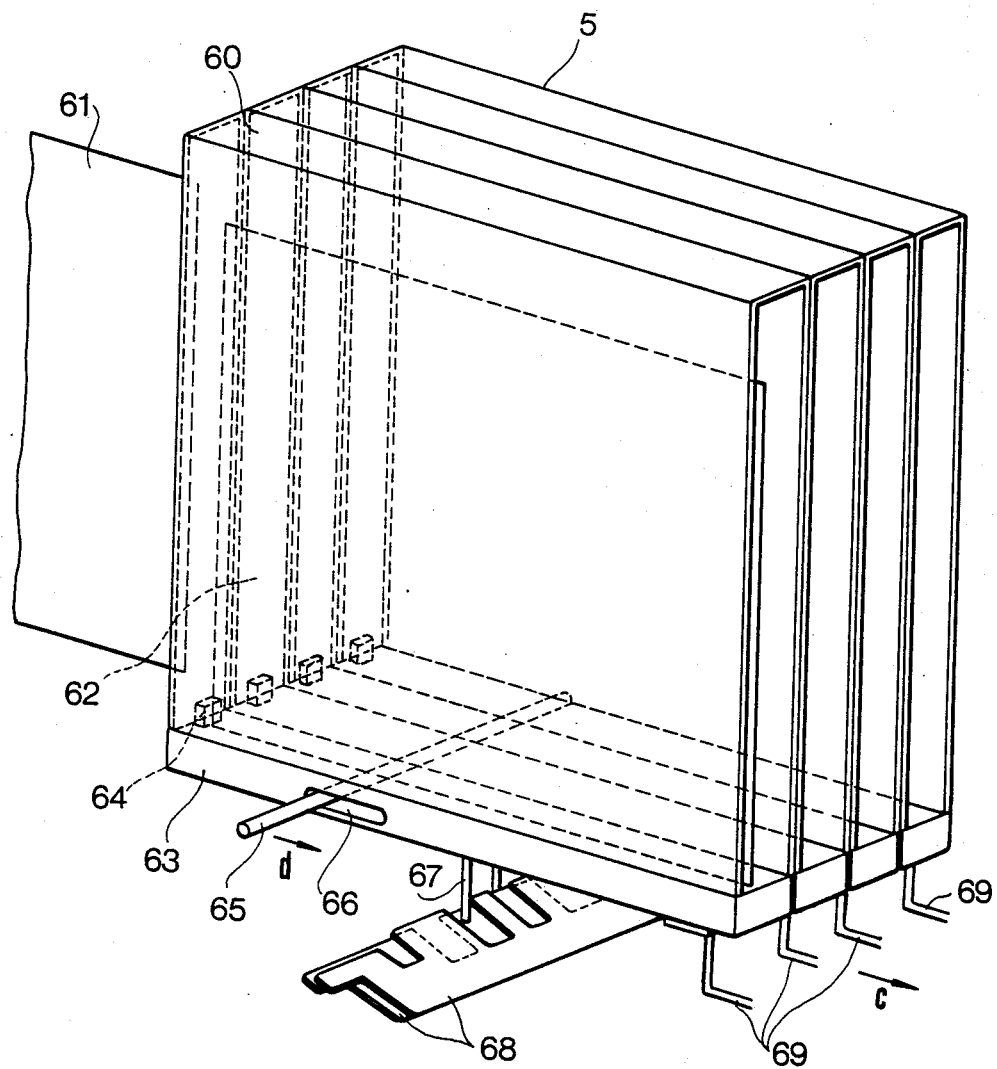
FIG. 6 is an overall perspective view showing an embodiment of a card sorting rack.

FIG. 6 shows the construction of an embodiment of the card rack 5. Numeral 60 denotes a single rack for holding at least one card, 61 a card immediately before the card is introduced to the rack 60, and 62 the card after it has been placed on the rack 60.

Numeral 63 denotes a card support member on which the card 62 is supported substantially vertically, as shown in FIG. 6. A hook 64 is for pushing the card 62 out of the rack, and a bar 65 is for holding the card supporting member 63 at the present position. The card supporting member has an oblong hole 66 that allows the bar 65 to be moved. Numeral 67 denotes a bar for holding the card supporting member at the present position. A selecting member 68 is for selecting at least one of the card supporting members. Numeral 69 denotes a pulling member for applying respectively a constant force to the card supporting members at all times in the direction of the arrow c.

Figure 7:
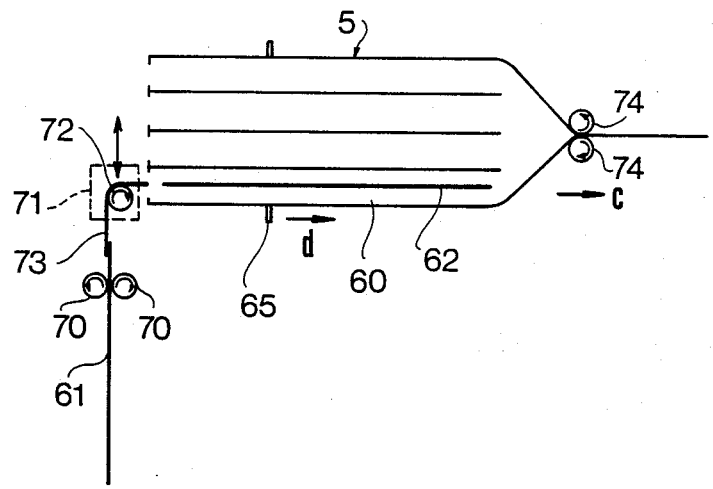
FIG. 7 is a top view of the card sorting rack shown in FIG. 6.

FIG. 7 illustrates the card rack 5 as viewed from above. When the card 61 is fed in by rollers 70, the card is introduced into a card transfer selector 71, which is movable in the direction of the arrow and corresponds to the input selector portion 17 of FIG. 2. The card transfer selector 71 is equipped with a roller 72 and a card guide 73 and is adapted to feed a delivered card 61 into a desired rack by moving in the direction of the arrow. In FIG. 7, the card 61 is shown to be introduced into the rack 60.

When the card 62 is to be fed out of the rack 60, the controller 43 causes the selecting member 68, which corresponds to the output selector 18 of FIG. 2, to move a prescribed amount so that only the bar 67 of the card supporting member 63 is capable of being moved. Thereafter, the bar 65 is moved in the direction of arrow d, whereupon all of the card supporting members of the card rack 5 are freed so as to be capable of movement in the direction of arrow c. However, since only the card supporting member 70 of the rack 60 is rendered movable by the action of the selecting member 68, only this supporting member 63 is projected in the direction of the arrow c, so that the card 62 is fed to the outer side of the card rack 5.

The card 62 thus fed out of the rack 5 is delivered to the exterior of the rack by a delivery roller 74. Note that the card rack 5 is shown to be wider than in actuality in FIG. 7 for the purpose of simplifying the description. However, it will suffice if the rack is slightly wider than the thickness of a card, so that the overall width of the rack can be made very small.

Figure 8:
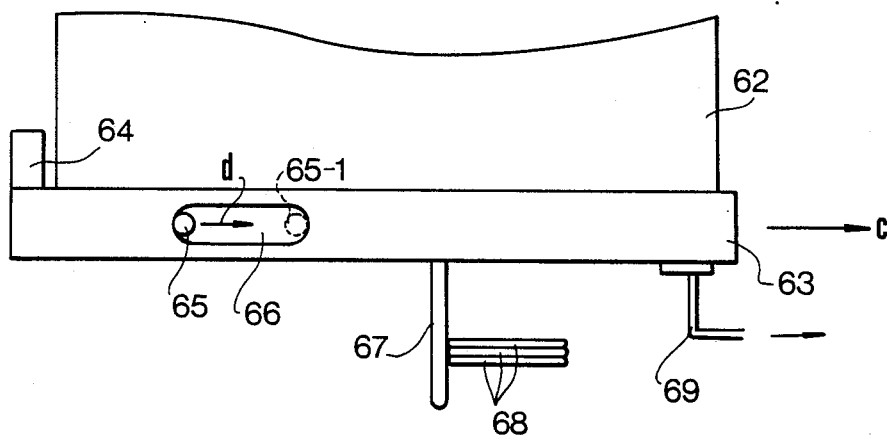
FIG. 8 is a side view of a card holding member.

FIG. 8 is a side view of the card supporting member 63, in which portions similar to those shown in FIGS. 6 and 7 are designated by like reference characters. When the bar 65 is moved in the direction of arrow d to the position shown at 65-1, the card supporting member 63 is capable of movement in the direction of arrow c. If a slit is defined by the selecting member 68 under these conditions, the corresponding bar 67 of the card supporting member 63 is capable of movement in the direction of the arrow c. Thus, the card supporting member 63 is moved to deliver the card 62 in the direction of arrow c.

Figure 9:
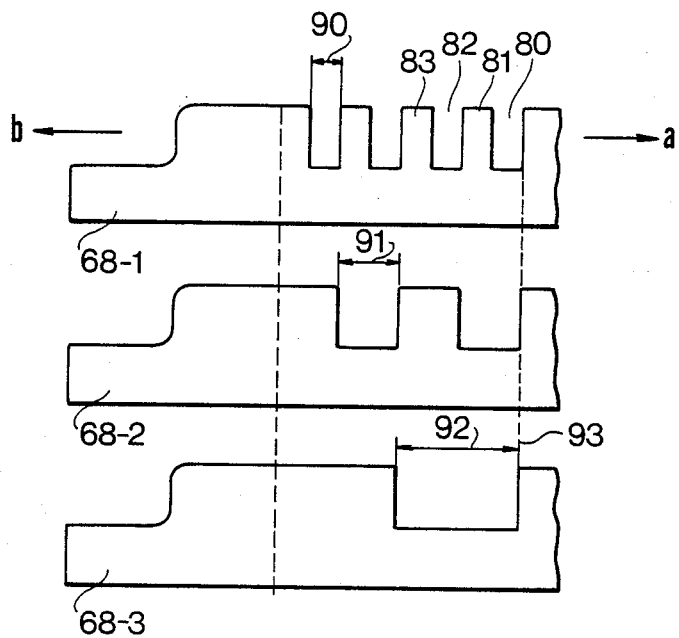
FIG. 9 is a view showing a selecting member.

FIG. 9 illustrates the construction of the selecting member 68, which is constituted by three selecting members 68-1, 68-2, 68-3 in the present embodiment. When the three selecting members 68-1, 68-2, 68-3 are overlapped with a line 93 serving as a reference or datum line, only a portion 80 is selected. When the selecting member 68-1 is moved by a pitch 90 in the direction of arrow a, a portion 82 is shifted to the portion 80 in order to be selected. Next, when the selecting member 68-2 is moved by a pitch 91 in the direction of arrow b from the position shown in FIG. 9, the portions 82, 83 are selected, just as mentioned above. The other portions can be selected in a similar manner by moving the selecting member 68-3 through a pitch 92 in the direction of arrow b.

In the embodiment described above, the cards are introduced to the card rack in a substantially vertical state. However, the invention is not limited to such an arrangement. In addition, the method of selecting and moving the card supporting member is not limited to the illustrated embodiment. For example, the individual card supporting members can each be provided with a pulling member such as a solenoid so that the card supporting members can be pulled and moved individually.

Figure 10:
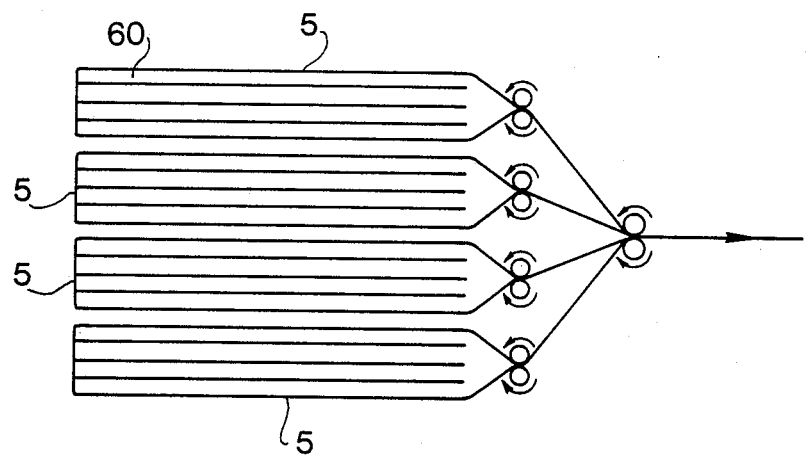
FIG. 10 is a top view of an assembly of card sorting racks according to the present invention.

Further, since each rack 60 can be made small in width, it is possible to adopt an arrangement in which a plurality of card racks 5 are arranged side by side and a single card is extracted from these racks, as shown in FIG. 10.

Though not set forth in the above embodiment, it goes without saying that cards can be extracted and delivered from a plurality of card racks simultaneously.

ADVANTAGES OF THE INVENTION

According to the present invention as described above, there is provided a compact card sorting apparatus capable of automatically sorting and changing the order of cards or the like in an efficient manner with but a few card transfers.

The present invention provides a very useful card sorting apparatus for sorting checks and bills at banks or the like, computer punch cards, magnetic ledgers, magnetic cards and OCR cards.

According to the present invention as described above, there is provided a very slender, inexpensive rack for sorting cards. In addition, according to the present invention, the arrangement is such that a card can be supported and moved in its entirety. This enables the rack to be applied even to cards made of thin paper without being influenced by the card material. Since the cards are not subjected to friction, the rack does not produce static electricity.

The present invention also provides a card sorting method that enables cards to be sorted and the order thereof changed efficiently with only a few card transfer operations. Since there are but few card movements, cards can be sorted with very little damage thereto.

As many apparently widely different embodiments of the present invention can be made without departing from the spirit and scope thereof, it is to be understood that the invention is not limited to the specific embodiments thereof except as defined in the appended claims.

What we claim is:

1. A card sorting method for sorting cards into a predetermined order based on characters or numerals borne by said cards, comprising the steps of:
   (a) initially accommodating a plurality of cards to be arranged in one of plural card accommodating means (101, (1), (2);
   (b) reading characters or numerals borne by cards selected to be delivered from one of said plural card accommodating means to a card holding means (103), (5);
   (c) delivering a predetermined number of read cards to said card holding means from one of said plural card accommodating means;
   (d) comparing cards held in said card holding means with one another;
   (e) delivering a card which meets a selecting condition corresponding to said predetermined order in said card holding means to a receiving section (28, 29) of one of said plural card accommodating means to empty one portion of said card holding means (5);
   (f) replenishing said portion of said card holding means from which a card has been delivered to a said receiving section with a read card from said one of plural card accommodating means; and
   (g) repeating steps (d) through (f) until all of said plurality of cards initially accommodated in one of said plural card accommodating means have been read once and selected to be arranged in at least one of said plural card accommodating means, and said card holding means contains no cards;
   (h) and thereafter, if more than one of the plurality of card accommodating means accommodate cards which are not arranged in said predetermined order then causing the merging of the plurality of arranged cards between said plurality of card accommodating means until all cards are arranged in the predetermined order in a single one of said card accommodating means.

2. A card sorting apparatus for sorting a plurality of cards in a predetermined order based on characters or numerals borne by said cards comprising:
   a plurality of card accommodating means, including a main card accommodating means (1) and at least one further card accommodating means (2) said main accommodating means initially accommodating a plurality of said cards;
   each of said card accommodating means having a receiving section (28, 29) provided to receive said cards, and a delivery section for delivering the cards;
   stacking means (22, 21) for stacking cards in sequence as an input queue in each said card accommodating means as cards are received from said receiving section (28, 29), and for moving cards to said delivery section (25, 26);
   card delivery means (23, 24) for delivering cards from said delivery section (25, 26) in said card accommodating means;
   card holding means (5) for holding a plurality of cards delivered from said delivery section (25) of said main card accommodating means (1);
   reading means (3, 4) for reading numerals borne by cards to be delivered by said card delivery means (23, 24) from said main card accommodating means to said card holding means (5);
   card transfer means (102) for feeding and transferring cards from said delivering means between said plurality of card accommodating means and said card holding means;
   memory means for storing values of said numerals or characters read by said reading means, and for storing the values of the cards held by said card holding means (5); and
   control means (100) causing, for the purpose of arranging said cards, the transfer a predetermined number of cards accommodated in said main card accommodating means (1) to said card holding means (5) by controlling said cards delivery means (23) and said card transfer means (102), and for comparing the values of each card held in said card holding means (5) with all other cards held in said holding means (5), and for delivering a card satisfying selection criterion to one of said input queues in the corresponding card accommodating means (1);
   wherein all cards in said card holding means (5) are compared with each other and those cards which have finished being compared are rearranged in said input queues in an order according to their read value in at least one of said plural card accommodating means until said cards originally accommodated in said main card accommodating means (1) are all rearranged in said input queues;
   said control means being further operable for causing said cards in said input queues to be resorted and to be arranged in the predetermined order in said main card accommodating means to complete the sorting when said cards are rearranged in said input queues in a plurality of said card accommodating means.

* * * * *